United States Patent
Bae et al.

(10) Patent No.: US 8,050,492 B2
(45) Date of Patent: Nov. 1, 2011

(54) APPARATUS AND METHOD FOR GENERATING AND OUTPUTTING STEREOSCOPIC IMAGES

(75) Inventors: Hyung-Jin Bae, Suwon-si (KR); Kwang-Cheol Choi, Gwacheon-si (KR)

(73) Assignee: Samsung Electronics Co., Ltd (KR)

( * ) Notice: Subject to any disclaimer, the term of this patent is extended or adjusted under 35 U.S.C. 154(b) by 1121 days.

(21) Appl. No.: 11/834,330

(22) Filed: Aug. 6, 2007

(65) Prior Publication Data

US 2008/0031515 A1    Feb. 7, 2008

(30) Foreign Application Priority Data

Aug. 4, 2006    (KR) .................. 10-2006-0073908

(51) Int. Cl.
  *G06T 15/00*    (2006.01)
(52) U.S. Cl. ...................................................... 382/154
(58) Field of Classification Search ......................... None
See application file for complete search history.

(56) References Cited

U.S. PATENT DOCUMENTS

2009/0285302 A1*  11/2009  Kato et al. ............... 375/240.16

FOREIGN PATENT DOCUMENTS

| JP | 2005-328299 | 11/2005 |
| KR | 1020060060102 | 6/2006 |
| KR | 1020070032515 | 3/2007 |

* cited by examiner

*Primary Examiner* — Brian Werner
(74) *Attorney, Agent, or Firm* — The Farrell Law Firm, P.C.

(57) ABSTRACT

An apparatus and a method for generating and outputting stereoscopic images. A user can select either a barrier mode and an interlaced mode. In the barrier mode, images are generated in the barrier scheme, whereas in the interlaced mode, images are generated in the interlaced scheme. In a case where the user selects the interlaced mode, when the images are detected with the left and right camera sensors, the images are rotated by −90 degrees and are then detected. Subsequently, stereoscopic images are generated from rotated images according to the barrier scheme, and generated images are stored along with information on a currently set image generation mode. Next, when the user desires to output the stored stereoscopic images through an interlaced output device for providing stereoscopic images in the interlaced scheme, the stored stereoscopic images are rotated by 90 degrees, and the rotated stereoscopic images are provided to the interlaced output device. Accordingly, without an additional configuration unit for a special purpose, the stereoscopic images stored in the barrier scheme can be output as normal stereoscopic images through the interlaced output device.

26 Claims, 7 Drawing Sheets (a)

| 0×0 | 0×4 | 0×8 | 0×12 |
|---|---|---|---|
| 0×1 | 0×5 | 0×9 | 0×13 |
| 0×2 | 0×6 | 0×10 | 0×14 |
| 0×3 | 0×7 | 0×11 | 0×15 |

(b)

| 0×100 | 0×104 | 0×108 | 0×112 |
|---|---|---|---|
| 0×101 | 0×105 | 0×109 | 0×113 |
| 0×102 | 0×106 | 0×110 | 0×114 |
| 0×103 | 0×107 | 0×111 | 0×115 |

(c)

| 0×0 | 0×104 | 0×8 | 0×112 |
|---|---|---|---|
| 0×1 | 0×105 | 0×9 | 0×113 |
| 0×2 | 0×106 | 0×10 | 0×114 |
| 0×3 | 0×107 | 0×11 | 0×115 |

(d)

| 0×0 | 0×1 | 0×2 | 0×3 |
|---|---|---|---|
| 0×104 | 0×105 | 0×106 | 0×107 |
| 0×8 | 0×9 | 0×10 | 0×11 |
| 0×112 | 0×113 | 0×114 | 0×115 |

FIG.5

APPARATUS AND METHOD FOR GENERATING AND OUTPUTTING STEREOSCOPIC IMAGES

PRIORITY

This application claims priority under 35 U.S.C. §119(a) to an application filed in the Korean Industrial Property Office on Aug. 4, 2006 and assigned Serial No. 2006-0073908, the contents of which are incorporated herein by reference.

BACKGROUND OF THE INVENTION

1. Field of the Invention

The present invention generally relates to an apparatus for generating stereoscopic images, and more particularly to an apparatus and a method for generating and outputting stereoscopic images, which enable even an output device adopting an interlaced scheme to use stereoscopic images stored in a scheme of barrier Liquid Crystal Display (LCD) (barrier scheme).

2. Description of the Related Art

In general, typical stereoscopic images are generated through both eyes of a human being, i.e. a difference of the visual angles between the left and right eyes, i.e. binocular disparity. This binocular disparity of the human being is generated because the left eye and the right eye are placed at a short distance therebetween, and because images according to the visual angles of the left and right eyes are different from each other. Thus, in order to imitate a three-dimensional effect created through both eyes of the human being, two cameras are needed to generate these stereoscopic images.

Two methods for generating these stereoscopic images include an interlaced scheme that supports a scheme of shuttered glasses, and a barrier scheme.

FIG. 1 show diagrams (a)-(d) where stereoscopic images are created in the barrier scheme and in the interlaced scheme by apparatuses for generating the stereoscopic images, equipped with the two cameras as stated above. Diagram (a) of FIG. 1 shows pixels sensed with the left camera, and diagram (b) of FIG. 1 shows pixels sensed with the right camera. Diagram (c) and diagram (d) of FIG. 1 show stereoscopic images generated by using diagram (a) and diagram (b). Diagram (c) of FIG. 1 shows stereoscopic images (barrier scheme images) generated in a barrier scheme, and diagram (d) shows stereoscopic images (interlaced scheme images) generated in an interlaced scheme.

For starters, barrier scheme images are created from the left to the right by selecting the pixels sensed with the left and right cameras as in the following. The first single file of the pixels sensed with the left camera is arranged, the second single file of the pixels sensed with the right camera is arranged, the third single file of the pixels sensed with the left camera is arranged, the fourth single file of the pixels sensed with the right camera is arranged, and likewise. Namely, as shown in diagram (c) of FIG. 1, when the first file of the barrier scheme images is extracted from the first file 100 among the pixels sensed with the left camera, the second file is extracted from the second file 102 among the pixels sensed with the right camera. In this way, the pixels sensed with the left and right cameras are extracted by turns from the left to the right, and accordingly, the stereoscopic images are created as shown in diagram (c) FIG. 1, in which the files of the pixels sensed with the left and right cameras are included repeatedly and by turns. This barrier scheme corresponds to a scheme of generating the stereoscopic images, primarily used in mobile terminals, such as mobile phones or the like. When a mobile terminal using the barrier scheme outputs the barrier scheme images, outputting only the pixels detected with the left camera and providing only the pixels detected with the right camera are swiftly repeated. On this account, an optical illusion phenomenon occurs, and users can see the stereoscopic images through this optical illusion phenomenon.

On the other hand the interlaced scheme images are created from the top to the bottom by selecting the pixels sensed with the left and right cameras as follows. The first single rank of the pixels sensed with the left camera is arranged, the second single rank of the pixels sensed with the right camera is arranged, the third single rank of the pixels sensed with the left camera is arranged, the fourth single rank of the pixels sensed with the right camera is arranged, and so on. Namely, as shown in diagram (d) of FIG. 1, when the first rank of the interlaced scheme images is extracted from the first rank 150 among the pixels sensed with the left camera, the second rank is extracted from the second rank 152 among the pixels sensed with the right camera. In this way, the pixels sensed with the left and right cameras are extracted by turns from the top to the bottom, and accordingly, the stereoscopic images are created as shown in diagram (d) of FIG. 1, in which the ranks of the pixels sensed with the left and right cameras are included repeatedly and by turns.

This interlaced scheme is primarily used in television (TV) sets, etc. In the TV sets outputting stereoscopic images by using these interlaced scheme images, shuttered glasses may be also used. While being synchronized with a synchronizing signal provided from the TV set, the shuttered glasses enable a user to watch only the pixels detected with the left camera for any one moment, and enable the user to watch only the pixels detected with the right camera for the next moment. Providing the pixels is rapidly repeated. Therefore, when these shuttered glasses are used, while the TV set supplies the user with the interlaced scheme images, the user watches the ranks of the pixels detected with the left and right cameras by shifts. As a result, an optical illusion phenomenon occurs, and the user can see the stereoscopic images through this optical illusion phenomenon.

Still, as aforementioned, it is usual that the mobile terminal, etc., adopts the barrier scheme. In consequence, if the stereoscopic images are stored in the mobile terminal, these stereoscopic images are stored in the form of the barrier scheme images. Accordingly, when the barrier scheme images are directly provided from the TV set, normal stereoscopic images are not only created, the images themselves are damaged.

FIG. 2 shows diagrams (a)-(c) where stereoscopic images stored in a mobile terminal corresponding to an apparatus for generating images in the barrier scheme are output as images according to an interlaced scheme.

Diagram (a) of FIG. 2 shows barrier scheme images generated by extracting the images sensed with the left and right cameras by turns. Accordingly, when images stored in the barrier scheme are output through the TV set generating the stereoscopic images in the interlaced scheme, the TV set detects a currently input barrier scheme image as an interlaced scheme image, extracts ranks 200 and 202 having odd line numbers or ranks 250 and 252 having even line numbers from the images of diagram (a) of FIG. 2, and outputs the extracted ranks. In this case, on the TV set, as shown in digrams (b) and (c) of FIG. 2, the ranks (i.e. diagram (b)) having the odd line numbers or the ranks (i.e. diagram (c)) having the even line numbers of the reference images (i.e. diagram (a)) are quickly and repeatedly output.

It should be noted that diagram (a) of FIG. 2 illustrates not the interlaced scheme images, but the barrier scheme images.

Accordingly, each rank of the images illustrated in diagram (a) of FIG. 2 includes the pixels sensed with the left camera in company with the pixels sensed with the right camera. On this account, the stereoscopic images provided from the TV set include the pixels sensed with the right camera, even though only the screen viewed through the left eye should be output (refer to diagram (b) of FIG. 2), and also includes the pixels sensed with the left camera, even though only the screen viewed through the right eye should be output (refer to diagram (c) of FIG. 2). Consequently, problems appear in that normal stereoscopic images are not only created, the images themselves are damaged.

SUMMARY OF THE INVENTION

Accordingly, the present invention has been made to solve the above problems occurring in the prior art, and it is an aspect of the present invention to provide an apparatus and a method for generating and outputting stereoscopic images, which enable an output device for outputting first stereoscopic images in a first scheme different from a second scheme of generating second stereoscopic images to receive the second stereoscopic images generated either in the interlaced scheme or in the barrier scheme to provide normal stereoscopic images.

Furthermore, it is another aspect of the present invention to provide an apparatus and a method for generating and outputting stereoscopic images, which enable an output device for outputting first stereoscopic images in an interlaced scheme to use second stereoscopic images generated in a scheme of barrier LCD without a special additional configuration unit.

In order to accomplish these aspects of the present invention, there is provided an apparatus for generating stereoscopic images in a scheme of barrier LCD according to the present invention, the apparatus including an Image Signal Processing (ISP) unit for detecting, as a left image and a right image, a first light signal provided from a left camera sensor and a second light signal provided from a right camera sensor; a stereoscopic image processing unit for generating a stereoscopic image according to a scheme of barrier LCD by using the left image and the right image; a memory unit for storing the generated stereoscopic image; and a control unit for controlling the ISP unit to detect the first and second light signals provided from the left camera sensor and the right camera sensor as images rotated by −90 degrees when an interlaced mode is selected when one of the interlaced mode and a mode of barrier LCD is selected by a user, rotating the stereoscopic image by 90 degrees, and for providing to an output device the stereoscopic image rotated by 90 degrees, when the output device selected to output the stereoscopic image corresponds to a device for outputting stereoscopic images in the interlaced scheme.

In accordance with another aspect of the present invention, there is provided an apparatus for generating stereoscopic images in an interlaced scheme according to the present invention, the apparatus including an ISP unit for detecting, as a left image and a right image, a first light signal provided from a left camera sensor and a second light signal provided from a right camera sensor; a stereoscopic image processing unit for generating a stereoscopic image according to the interlaced scheme by using the left image and the right image; a memory unit for storing the generated stereoscopic image; and a control unit for controlling the ISP unit to detect the first and second light signals provided from the left camera sensor and the right camera sensor as images rotated by 90 degrees when a mode of barrier LCD is selected when one of the interlaced mode and the mode of barrier LCD is selected by a user, for rotating the stereoscopic image by −90 degrees, and for providing to an output device the stereoscopic image rotated by −90 degrees, when the output device selected to output the stereoscopic image corresponds to a device for outputting stereoscopic images in the scheme of barrier LCD.

In accordance with a further aspect of the present invention, there is provided an apparatus for generating stereoscopic images in a scheme of barrier LCD according to the present invention, the apparatus including an ISP unit for detecting, as a left image and a right image, a first light signal provided from a left camera sensor and a second light signal provided from a right camera sensor; a memory unit for storing the left image and the right image; a stereoscopic image processing unit for generating a stereoscopic image according to the scheme of barrier LCD by using the left image and the right image; and a control unit for rotating the left image and the right image by −90 degrees, respectively, when a currently selected output device for outputting stereoscopic images is in an interlaced mode, for generating a stereoscopic image, for rotating the completed stereoscopic images by 90 degrees when generating the stereoscopic image is completed, and for outputting the stereoscopic images rotated by 90 degrees to the output device.

In accordance with a still further aspect of the present invention, there is provided a method for generating stereoscopic images by an apparatus for generating stereoscopic images in a scheme of barrier LCD according to the present invention, the method including selecting one of an interlaced mode and a mode of barrier LCD by a user; detecting the first and second light signals provided from the left and right camera sensors of the apparatus for generating stereoscopic images as images rotated by −90 degrees when a selected mode corresponds to the interlaced mode; and generating stereoscopic images according to the mode of barrier LCD by using the detected images, and storing the generated stereoscopic images.

In accordance with a yet further aspect of the present invention, there is provided a method for generating stereoscopic images by an apparatus for generating stereoscopic images in an interlaced scheme according to the present invention, the method including selecting either an interlaced mode or a mode of barrier LCD by a user; detecting the first and second light signals provided from the left and right camera sensors of the apparatus for generating stereoscopic images as images rotated by 90 degrees when a selected mode corresponds to the mode of barrier LCD; and generating stereoscopic images according to the mode of barrier LCD by using the detected images, and storing the generated stereoscopic images.

In accordance with a still yet further aspect of the present invention, there is provided a method for generating stereoscopic images by an apparatus for generating stereoscopic images in a scheme of barrier LCD according to the present invention, the method including detecting, as a left image and a right image, a first light signal provided from a left camera sensor and a second light signal provided from a right camera sensor, and storing the left image and the right image; sensing a scheme of outputting stereoscopic images that an output device for outputting stereoscopic images supports according to a user's selection when the user desires to output the stored stereoscopic images; rotating the left image and the right image by −90 degrees, respectively, when the scheme of outputting stereoscopic images that the output device for outputting stereoscopic images supports corresponds to a scheme of outputting stereoscopic images an interlaced mode; and processing stereoscopic images processing by using the rotated left image and the rotated right image, rotating the processed stereoscopic images by 90 degrees again, and generating stereoscopic images of the interlaced scheme.

BRIEF DESCRIPTION OF THE DRAWINGS

The above and other exemplary features, aspects, and advantages of the present invention will be more apparent from the following detailed description taken in conjunction with the accompanying drawings, in which:

FIG. 5 is a view illustrating an example of stereoscopic images generated in an interlaced generation mode in an apparatus for generating stereoscopic images according to the present invention;

DETAILED DESCRIPTION OF THE PREFERRED EMBODIMENTS

Figure 1:
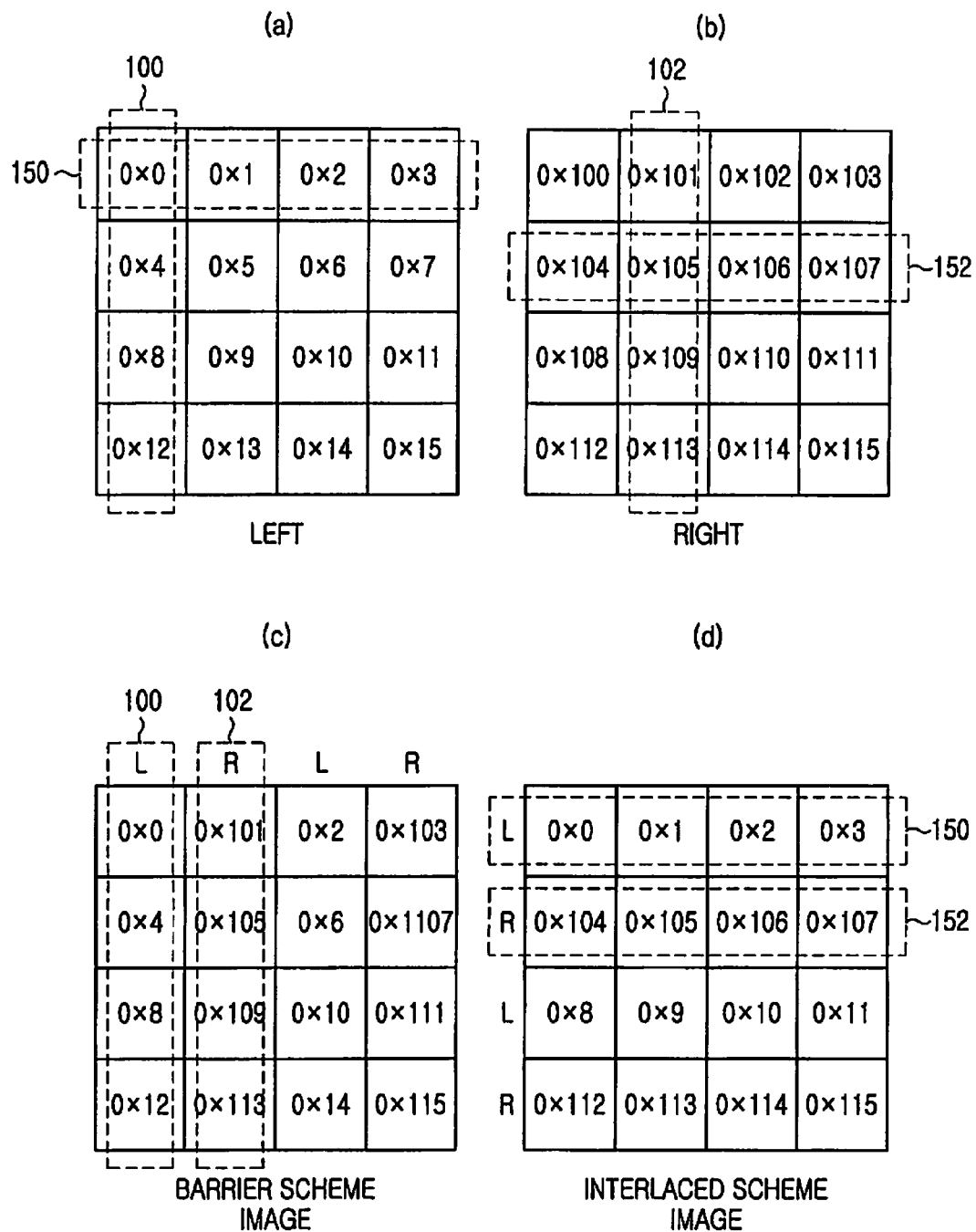
FIG. 1 is a view illustrating an example in which barrier scheme images and interlaced scheme images are created, which correspond to conventional stereoscopic images.
Figure 2:
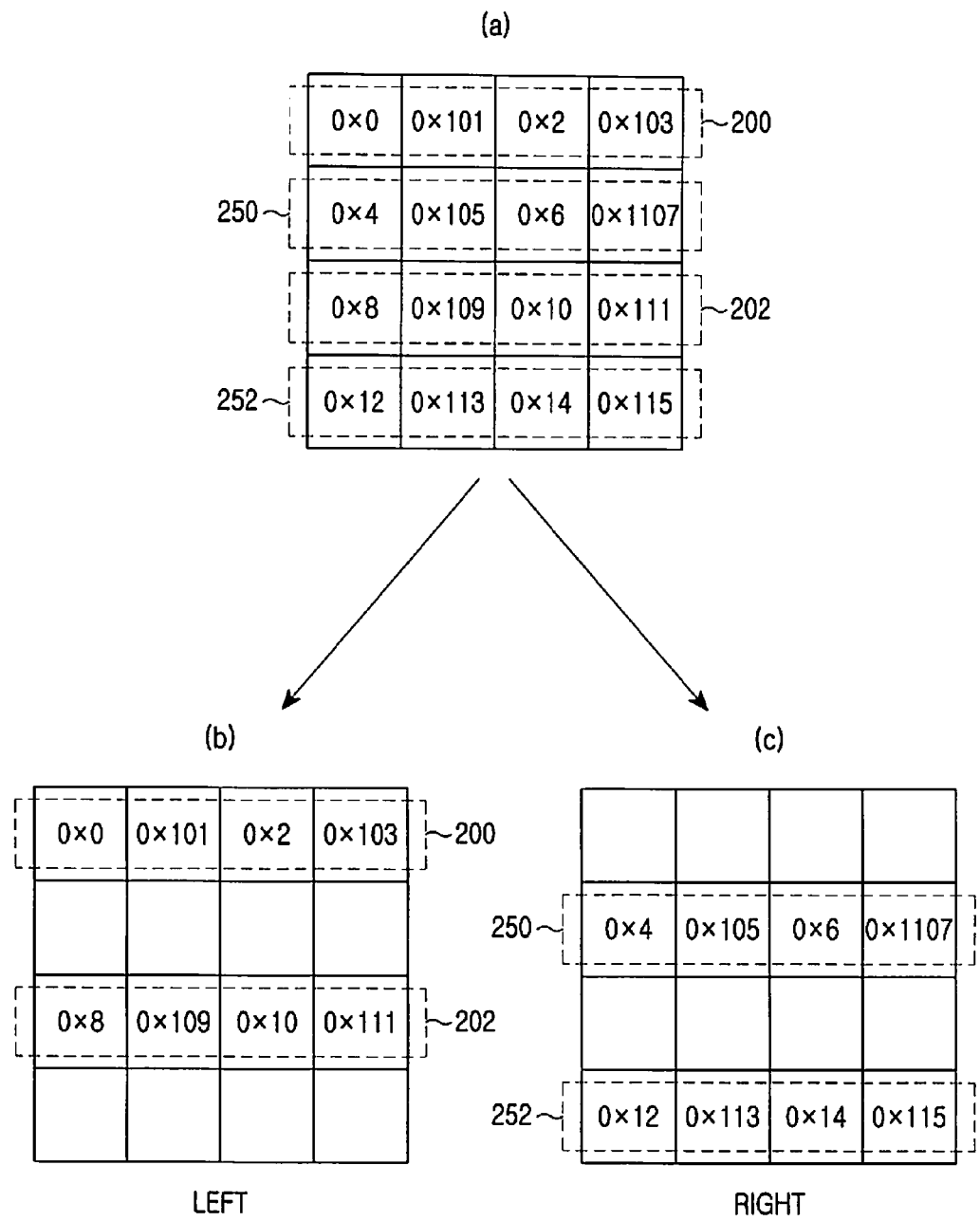
FIG. 2 is a view illustrating an example of a case of generating, as images according to an interlaced scheme, stereoscopic images generated through a mobile terminal corresponding to a device for generating barrier scheme images.

Hereinafter, preferred embodiments of the present invention will be described with reference to the accompanying drawings. The same elements will be designated by the same reference numerals all through the following description and drawings although they are shown in different drawings. Further, in the following description of the present invention, a detailed description of known functions and configurations incorporated herein will be omitted when it may make the subject matter of the present invention rather unclear.

To facilitate the fill understanding of the present invention, fundamental principles will be explained. In the present invention, in an apparatus for generating stereoscopic images in the barrier scheme, a user can select either a barrier mode and an interlaced mode. In the barrier mode, images are generated in the barrier scheme, whereas in the interlaced mode, images are generated in the interlaced scheme. In a case where the user selects the interlaced mode, when the images are detected with the left and right camera sensors, the images are rotated by −90 degrees and are then detected. Subsequently, stereoscopic images are generated from rotated images according to the barrier scheme, and generated images are stored along with information on a currently set image generation mode. Next, when the user desires to output the stored stereoscopic images through an interlaced output device for providing stereoscopic images in the interlaced scheme, the stored stereoscopic images are rotated by 90 degrees, and the rotated stereoscopic images are provided to the interlaced output device. Accordingly, in the present invention, without an additional configuration unit for a special purpose, the stereoscopic images stored in the barrier scheme can be output as normal stereoscopic images through the interlaced output device.

Figure 3:
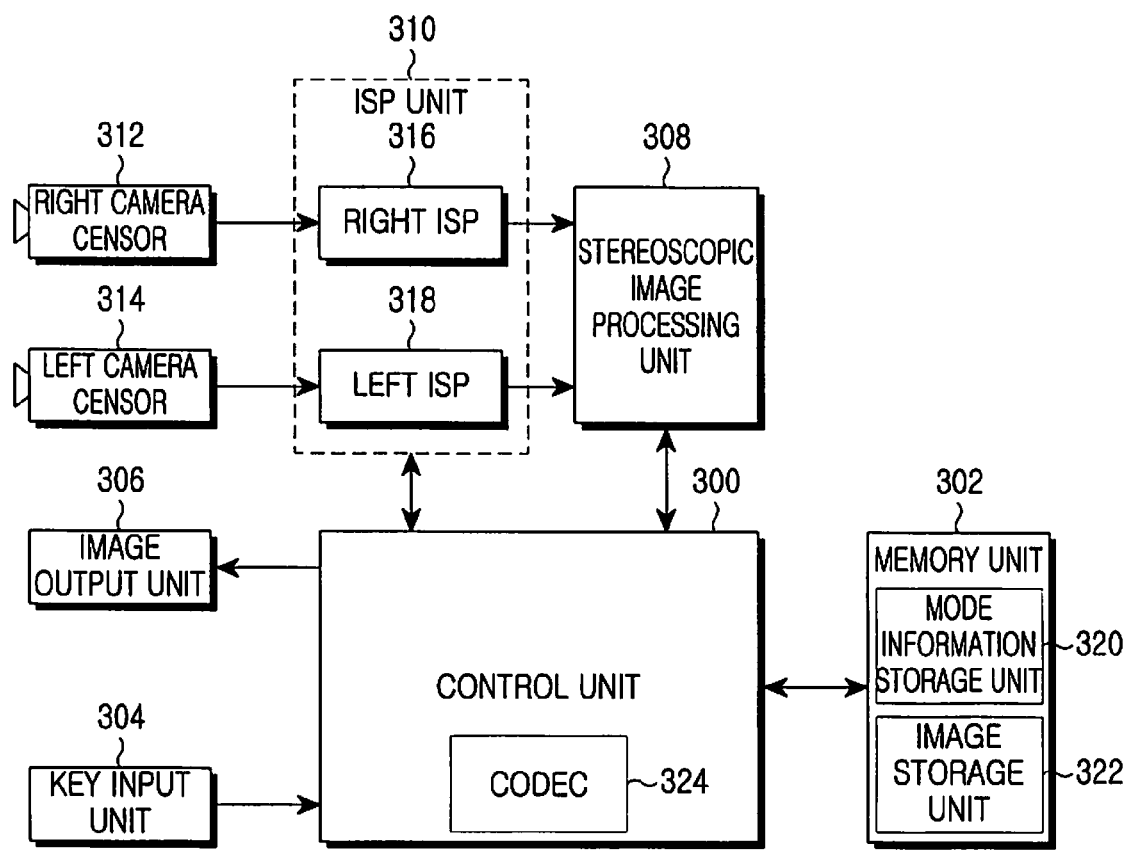
FIG. 3 is a block diagram of an apparatus for generating stereoscopic images according to the present invention.

FIG. 3 shows an apparatus for generating stereoscopic images according to the present invention. The apparatus for generating stereoscopic images shown in FIG. 3 includes a left camera sensor 314, a right camera sensor 312, a control unit 300, a memory unit 302 connected to the control unit 300, a key input unit 304, an image output unit 306, a stereoscopic image processing unit 308, and an Image Signal Processing (ISP) unit 310.

The right camera sensor 312 and the left camera sensor 314 can be constructed of Complementary Metal Oxide Semiconductor field effect transistors (CMOSs) or Charged Coupled Devices (CCDs), and detect right and left light signals to perceive the detected right and left light signals. In addition, the ISP unit 310 includes a right ISP 316 connected with the right camera sensor 312 and a left ISP 318 connected with the left camera sensor 314, and senses, as images, detected right and left light signals provided from the left and right camera sensors 314 and 312. According to a presently set generation mode of the stereoscopic images, under the control of the control unit 300, the ISP unit 310 senses, as images rotated −90 degrees, the left and right light signals detected with the left and right camera sensors 314 and 312. The stereoscopic image processing unit 308 by using the images sensed by the left and right ISPs 318 and 316 generates stereoscopic images in the aforesaid barrier scheme.

The control unit 300 controls all parts of the apparatus for generating stereoscopic images, enables the left and right camera sensors 314 and 312 to detects the left and right light signals according to a generation protocol of the barrier scheme stereoscopic images, and enables the left and right ISPs 318 and 316 to sense the detected left and right light signals as images. When the user selects a generation mode of the barrier scheme images, the sensed images are stereoscopic images processed through the stereoscopic image processing unit 308 in the barrier scheme. The stereoscopic image processing, as aforesaid, refers to a process for creating the stereoscopic images of the barrier scheme, i.e. the barrier scheme images, by using the images sensed with the left and right ISPs 318 and 316. The control unit 300 keeps in the memory unit 302 the generated barrier scheme images and the information on the currently set image generation mode.

When the user desires to output the stored barrier scheme images, the control unit 300 controls a COder/DECoder (CODEC) 324 to decode presently selected barrier scheme images, and controls an output device selected by the user among output devices connected to an image output unit 306 to provide decoded barrier scheme images. Various forms of output devices can be connected to the image output unit 306. To cite several examples of the output devices, a display unit of a mobile terminal or a Liquid Crystal Display (LCD) used in a monitor of a Personal Computer (PC), etc., can be connected to the image output unit 306. Besides, TV sets or beam projectors, etc., can be connected to the image output unit 306. In this case, the control unit 300 checks if the currently connected output device supports the barrier scheme or the interlaced scheme, and the user can get a warning message if stereoscopic images that are to be currently output are not compatible with an output scheme of stereoscopic images that the output device supports. The warning message (not shown) can be output as audible sounds through a speaker, can be provided as a light signal through Light Emitting Diodes (LEDs), etc., or can be visually expressed through the currently connected output device.

When the user stores the stereoscopic images with the selection of an image generation mode of the interlaced scheme, the control unit 300 controls the ISP unit 310 to sense, as the images rotated by −90 degrees, the left and right light signals detected with the left and right camera sensors 314 and 312.

Then, the control unit 300 controls the stereoscopic image processing unit 308 to stereoscopic image-process the rotated images in the barrier scheme. Consequently, when the images stored in the barrier scheme are rotated by 90 degrees again, as the interlaced scheme images illustrated in diagram (d) of FIG. 1, the images includes both the ranks of the pixels detected with the left camera sensor 314 and the ranks of the pixels detected with the right camera sensor 312. Moreover, the control unit 300 keeps in the memory unit 302 the stored barrier scheme images and the information on the presently set image generation mode. On this account, when the currently stored images are provided from the output device for outputting the stereoscopic images in the interlaced scheme, the images can be provided as the stereoscopic images of a normal interlaced scheme.

The memory unit 302 connected with the control unit 300 can be constructed of Read Only Memories (ROMs), flash memory, Random Access Memories (RAMs), etc. In the ROMs among these memories, programs for processes and controls of the control unit 300 and various kinds of data are stored. The RAMs provides the control unit 300 with a working memory. The flash memory provides an area for storing various types of data for storage which can be updated. When the flash memory is used to store the stereoscopic images, the flash memory includes a mode information storage unit 320 and an image storage unit 322. The mode information storage unit 320 corresponds to a first area for storing the information on the image generation mode that the user sets. The image storage unit 322 corresponds to a second area for storing the generated stereoscopic images.

A key input unit 304 is equipped with various sorts of keys, and provides a key input from the user to the control unit 300. The image output unit 306, as previously stated, is connected to a diversity of output devices, and outputs the stereoscopic images, which the control unit applies to the image output unit 306, to the output device that the user selects among the output devices currently connected with the image output unit 306. The image output unit 306 senses a stereoscopic image output scheme of the output device that the user selects at present, and informs the control unit 300 of the stereoscopic image output scheme of the output device.

Figure 4:
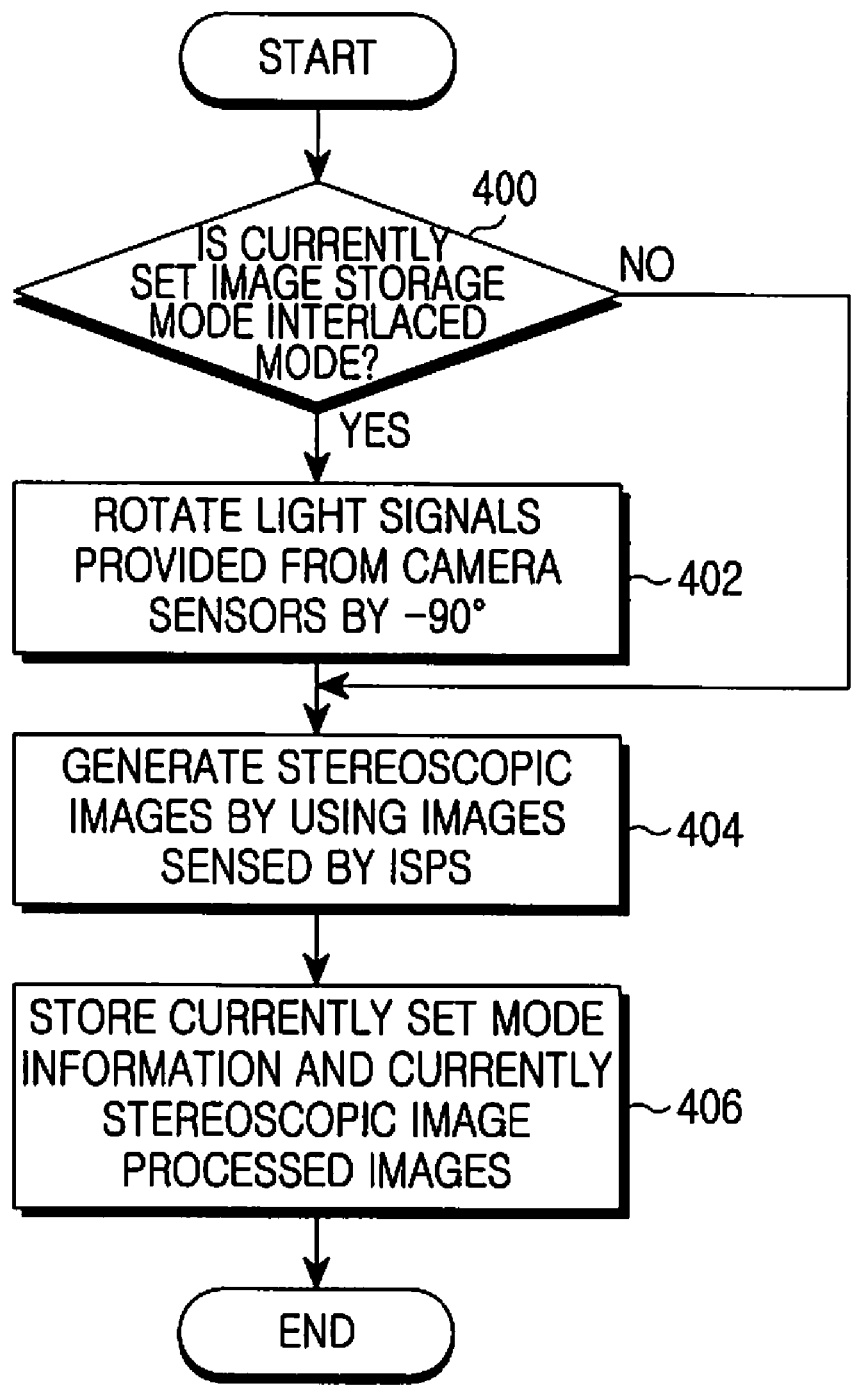
FIG. 4 is a flowchart illustrating an operation process for storing images that are stereoscopic image-processed according to a currently set stereoscopic image generation mode in an apparatus for generating stereoscopic images according to the present invention.

FIG. 4 shows an operation process for storing images that are stereoscopic image-processed according to a currently set stereoscopic image generation mode in an apparatus for generating stereoscopic images according to the present invention. FIG. 5 includes diagrams (a)-(d) of stereoscopic images generated in an interlaced generation mode in an apparatus for generating stereoscopic images according to the present invention.

Referring to FIG. 4, when storing the stereoscopic images, the control unit 300 of the apparatus for generating stereoscopic images according to the present invention proceeds to step 400 to check if a currently set image generation mode is the interlaced mode. If not, i.e. if the currently set image generation mode is the barrier mode, the control unit 300 proceeds to step 404 to apply to the stereoscopic image processing unit 308 images sensed by the left and right ISPs 318 and 316.

However, if it is checked in step 400 that the currently set image generation mode is the interlaced mode, the control unit proceeds to step 402, and controls the ISP unit 310 to sense, as images rotated by −90 degrees, left and right light signals detected with the left and right camera sensors 314 and 312. Namely, in step 402, as illustrated in diagrams (a) and (b) of FIG. 5, the left and right light signals detected with the left and right camera sensors 314 and 312 are sensed as the images rotated by 190 degrees. Thus, in step 402, pixels of the images sensed by the left and right ISPs 318 and 316, as shown in diagrams (a) and (b) of FIG. 5, form images with files arranged in the horizontal direction. Then, the control unit 300 proceeds to step 404 to apply the images sensed by the left and right ISPs 318 and 316 to the stereoscopic image processing unit 308.

Meanwhile, if the images sensed by the left and right ISPs 318 and 316 are applied to the stereoscopic image processing unit 308 through step 402 or 400, the control unit 300 enables the stereoscopic image processing unit 308 to generate stereoscopic images in the barrier scheme by using the applied images. Accordingly, in step 404, the control unit 300 extracts each file of the images by shifts, and generates the stereoscopic images formed from the extracted files. Hence, if the currently generated stereoscopic images are created by using the images sensed through step 402 as the images rotated by −90 degrees, the currently generated stereoscopic images can be generated as shown in diagram (c) of FIG. 5.

In this case, if the images are rotated by 90 degrees again, the stereoscopic images as shown in diagram (d) of FIG. 5 can be generated. It can be also perceived that the stereoscopic image generated through this process (refer to diagram (d) of FIG. 5) is the same as the interlaced scheme image illustrated in diagram (d) of FIG. 1. Thus, if the stereoscopic images are generated as in diagram (d) of FIG. 5D, the generated images can be output as normal stereoscopic images through TV sets providing stereoscopic images in the interlaced scheme.

After that, if the generation of the stereoscopic images is completed, the control unit 300 proceeds to step 406, and stores the generated stereoscopic images and the information on the currently set image generation mode in the image storage unit 322 and the mode information storage unit 320, respectively. Accordingly, if the user desires to select an output of specific stereoscopic images, the control unit 300 can check if a first output scheme of stereoscopic images that a presently selected output device supports is compatible with a second output scheme of stereoscopic images according to the mode information corresponding to the currently selected stereoscopic images.

Figure 6:
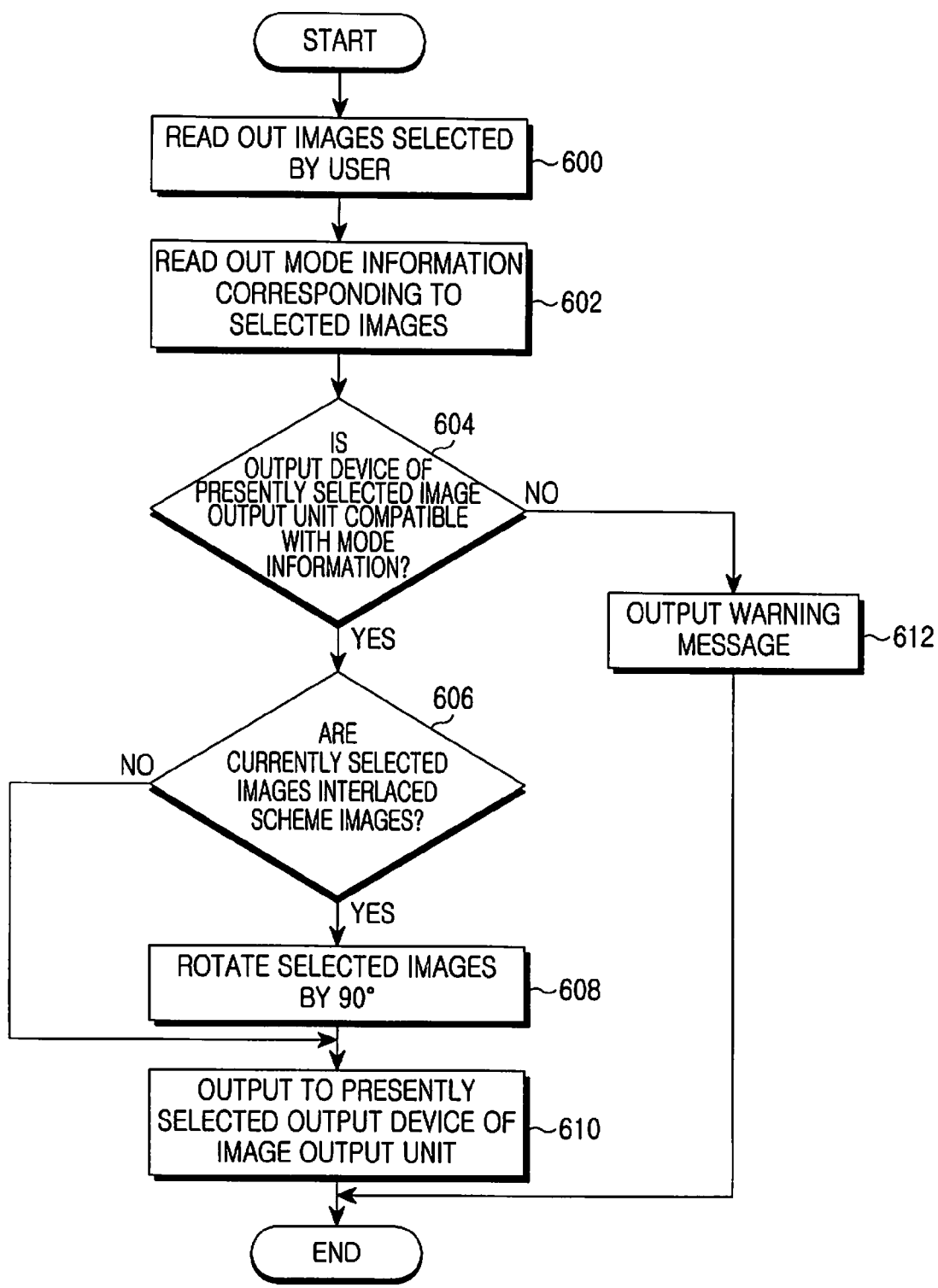
FIG. 6 is a flowchart illustrating an operation process for providing, through a currently selected output device, stereoscopic images previously stored in an apparatus for generating stereoscopic images according to the present invention.

FIG. 6 shows an operation process for providing, through a presently selected output device, stereoscopic images previously stored in an apparatus for generating stereoscopic images according to the present invention.

With reference to FIG. 6, if the user desires to output specific stereoscopic images, the control unit 300 of the apparatus for generating stereoscopic images according to the present invention proceeds to step 600 to read out the images selected by the user from the image storage unit 322. Then, the control unit 300 proceeds to step 602 to read out information on an image generation mode corresponding to the selected stereoscopic images from the mode information storage unit 320. Next, the control unit 300 proceeds to step 603 to check if an output device presently selected among the output devices currently connected to the image output unit 306 is compatible with the information on the image generation mode. Namely, it is checked in the step 604 if the presently selected output device supports the image generation mode of the stereoscopic images whose output is currently selected.

If it is determined in step 604 that the presently selected output device does not support the image generation mode of the stereoscopic images whose output is currently selected, the control unit 300 proceeds to step 612 to inform the user that the presently selected output device does not support the image generation mode of the stereoscopic images whose output is currently selected, and supplies the user with a warning message such that damaged images may be output. For instance, if the presently selected output device corresponds to a TV set providing stereoscopic images in the interlaced scheme, and if the stereoscopic images selected by the user correspond to the barrier scheme images, the control unit 300 can output a warning message in step 612.

Still, if it is determined in step 604 that the presently selected output device supports the image generation mode of the stereoscopic images whose output is currently selected, the control unit 300 proceeds to step 606 to check if the stereoscopic images whose output is currently selected are the interlaced scheme images. If it is determined in step 606 that the stereoscopic images whose output is currently selected are the interlaced scheme images, the control unit 300 proceeds to step 608 to rotate the selected stereoscopic images by 90 degrees. Thereafter, the control unit 300 proceeds to step 610 to output the stereoscopic images rotated by 90 degrees to the presently selected output device. Consequently, when the currently selected stereoscopic images have been created through an interlaced mode, even though the presently selected output device is the TV set, normal stereoscopic images, without damaging the images, can be provided through the TV set in the interlaced scheme.

On the contrary, if it is determined in step 606 that the stereoscopic images whose output is currently selected are not the interlaced scheme images, the control unit 300 proceeds to step 610 to directly output the currently stereoscopic images to the presently selected output device. Thus, if the selected output device corresponds to a display unit of a mobile terminal for outputting stereoscopic images in the barrier scheme, and if the currently selected stereoscopic images have been created in a barrier mode, stereoscopic images according to the barrier scheme can be output thorough the display unit. Consequently, the normal stereoscopic images can be provided through the output device supporting the barrier scheme or the interlaced scheme according to the user's selection without including a special additional device or additional configuration units in the present invention.

It goes without saying that in the apparatus for generating stereoscopic images according to the present invention, stereoscopic images according to each generation scheme of stereoscopic images are generated, and generated stereoscopic images can be provided as occasion demands, even though the user does not previously set the image generation mode, if not stereoscopic images whose generation is completed but the left and right images used to generate the stereoscopic images (i.e. the left image sensed by the left ISP 318 and the right image sensed by the right ISP 316) are stored in the memory unit 302 while creating the stereoscopic images.

In this case, if the user selects the generation of stereoscopic images, in another example of a control unit of an apparatus for generating stereoscopic images according to the present invention, the control unit stores, in a memory unit 302, not the stereoscopic images, but a left image sensed by a left ISP 318 and a right image sensed by a right ISP 316. Also, when a user desires to output stereoscopic images using the sensed images, stereoscopic images are generated in a scheme of a presently selected output device by using the sensed images according to an output scheme of stereoscopic images supported by the presently selected output device, and generated stereoscopic images are output.

Figure 7:
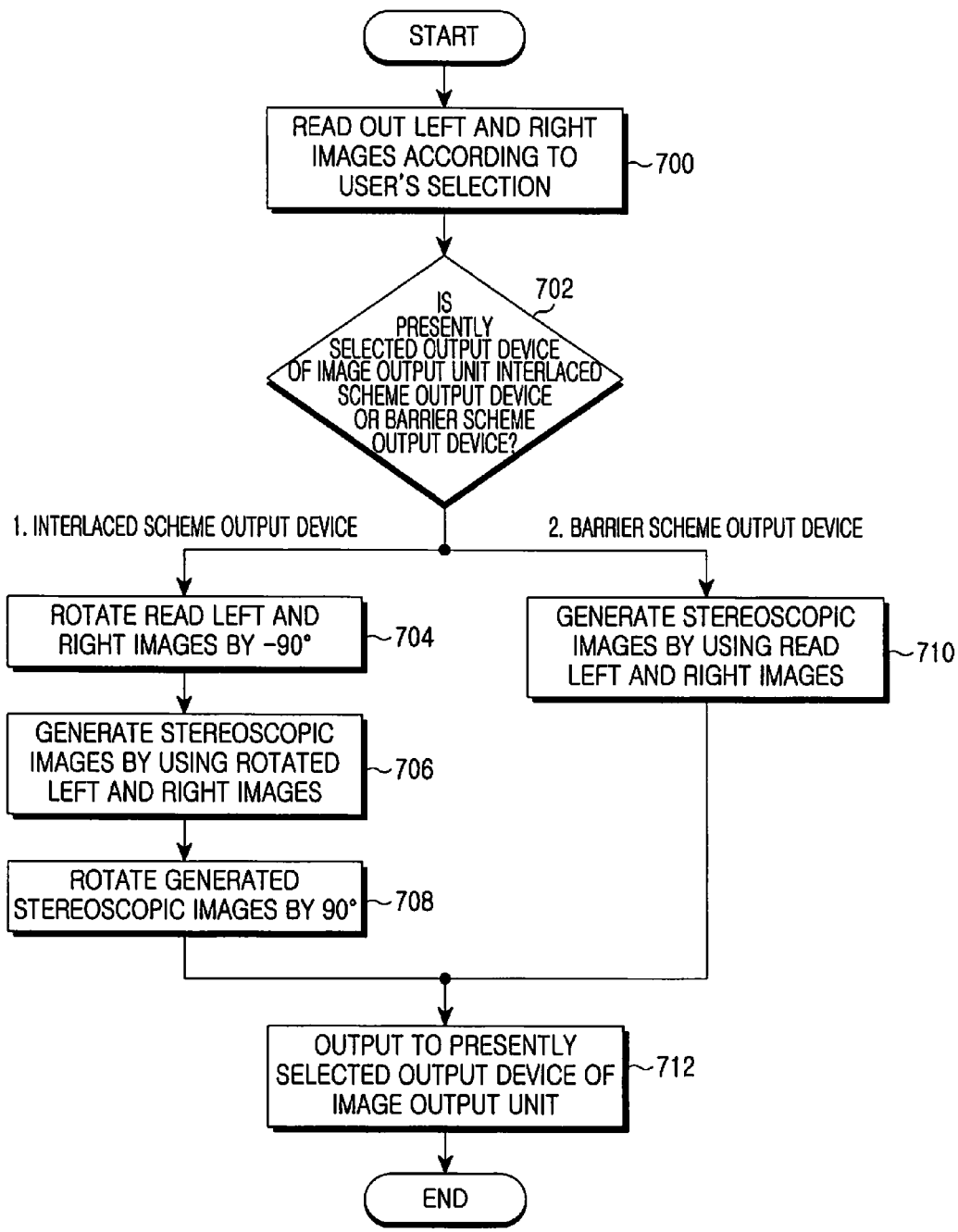
FIG. 7 is a flowchart illustrating an operation process for providing, through a currently selected output device, stereoscopic images previously stored according to the present invention.

FIG. 7 shows another example of an operation process for providing, through a currently selected output device, stereoscopic images previously stored according to the present invention.

With reference to FIG. 7, when the user desires to output stereoscopic images using the left and right images sensed by the left and right ISPs 318 and 316 and read from the memory unit 302 according to the present invention, the control unit of the apparatus for generating stereoscopic images according to the present invention proceeds to step 700 to read out the left and right images according to the user's selection. Then, the control unit of the apparatus for generating stereoscopic images according to the present invention proceeds to step 702 to check if the presently selected output device connected with an image output unit is an interlaced scheme output device providing stereoscopic images according to the interlaced scheme or a barrier scheme output device providing stereoscopic images according to the barrier scheme.

If it is determined in step 702 that the presently selected output device is the interlaced scheme output device, the control unit of the apparatus for generating stereoscopic images according to the present invention proceeds to step 704 to rotate the currently read left and right images by −90 degrees. Next, the control unit 300 applies the rotated left and right images to a stereoscopic image processing unit 308 in step 706, and generates stereoscopic images according to the barrier scheme by using the rotated left and right images. Also, the control unit of the apparatus for generating stereoscopic images according to the present invention proceeds to step 708 to rotate the generated stereoscopic images by 90 degrees. After that, the control unit 300 proceeds to step 712 to control the presently selected output device connected to the image output unit 306 to provide the generated stereoscopic images.

On the contrary, if it is determined in step 702 that the presently selected output device is the barrier scheme output device, the control unit immediately applies the left and right images read in step 700 to the stereoscopic image processing unit 308, and generates stereoscopic images according to the barrier scheme. Thereafter, the control unit of the apparatus for generating stereoscopic images according to the present invention proceeds to step 712 to control the presently selected output device connected to the image output unit 306 to provide the generated stereoscopic images. Hence, even though the user does not previously set a stereoscopic image storage scheme, stereoscopic images are automatically generated according to a stereoscopic image output scheme of the presently selected output device connected with the image output unit, i.e. what stereoscopic image output scheme the presently selected output device supports, and generated stereoscopic images can be output.

The merits and effects of preferred embodiments, as disclosed in the present invention, and as so configured to operate above, will be described as follows.

Accordingly, in the present invention, without including special additional configuration units, stereoscopic images generated either in the barrier scheme or in the interlaced scheme can be output as normal stereoscopic images even through the output device for providing stereoscopic images created in a first scheme different from a second scheme in which the stereoscopic images are generated.

While the invention has been shown and described with reference to certain preferred embodiments thereof, it will be understood by those skilled in the art that various changes in form and details may be made therein without departing from the spirit and scope of the invention. Specially, even though preferred embodiments of the present invention have been described on the assumption that the stereoscopic images are output through the output device, the rights of the present invention are not limited to this. For example, it goes without saying that the present invention can be applied even to a case of moving pictures accomplished by quickly outputting multiple continuous images, in that according to embodiments of the present invention, a stereoscopic image is created in the barrier mode in a state where each image of the moving pictures is rotated by −90 degrees, that a created image is rotated by 90 degrees again, and that the image rotated by 90 degrees is output through the output device of the interlaced scheme.

Also, in the embodiments of the present invention, even though the apparatus for generating stereoscopic images according to an embodiment of the present invention has been described on the assumption that the apparatus generates stereoscopic images in the barrier scheme, other than this, it goes without saying that the present invention can be applied even to an apparatus for generating stereoscopic images in the interlaced scheme. This is why even for the apparatus for generating stereoscopic images in the interlaced scheme, as previously stated in the present invention, the stereoscopic images are created by rotating the images provided from the left and right ISPs by 90 degrees, when the output device for providing stereoscopic images in the barrier scheme is selected because stereoscopic images rotated by −90 degrees are the same as the barrier scheme images if the created stereoscopic images are rotated by −90 degrees, even stereoscopic images generated in the interlaced scheme can be output as normal stereoscopic images through the output device for generating stereoscopic images in the barrier scheme. Therefore, the spirit and scope of the present invention correspond not only by embodiments described above but by the appended claims and equivalents of the appended claims.

What is claimed is:

1. An apparatus for generating stereoscopic images in a scheme of barrier Liquid Crystal Display (LCD), the apparatus comprising:
   an Image Signal Processing (ISP) unit for arranging, with a vertical direction as a reference, pixels related to each of a left image and a right image acquired through left and right camera sensors according to control under which images are generated in an interlaced mode, and for enabling the left image and the right image photographed in a horizontal direction to be output in the vertical direction;
   a stereoscopic image processing unit for generating a stereoscopic image according to the scheme of barrier LCD by using the left image and the right image, both of which are output in the vertical direction;
   a memory unit for storing the generated stereoscopic image; and
   a control unit for controlling the ISP unit depending on whether an image generation mode is set to an interlaced mode or a barrier mode, and for providing to an output device the stored stereoscopic image rotated by a preset angle, when the output device selected to output the stored stereoscopic image corresponds to an output device employing an interlaced scheme.

2. The apparatus as claimed in claim 1, wherein the ISP unit arranges, with the horizontal direction as the reference, the pixels related to each of a left and a right image acquired through a left and a right camera sensor according to control under which images are generated in a barrier mode, and enables the left and the right images photographed in the horizontal direction to be output as they stand.

3. The apparatus as claimed in claim 2, wherein the control unit provides, to an output device, the stored stereoscopic image as it stand, when the output device selected to output the stored stereoscopic image corresponds to an output device employing the barrier scheme.

4. The apparatus as claimed in claim 1, wherein the arranging, with a vertical direction as the reference, the pixels related to each of a left and a right image acquired through a left and a right camera sensor enables the left and the right images photographed in the horizontal direction to be output in the vertical direction corresponding to the direction of −90 degrees.

5. The apparatus as claimed in claim 1, wherein the preset angle corresponds to 90 degrees.

6. The apparatus as claimed in claim 1, wherein the control unit further includes storing mode information on one of the interlaced mode and the mode of barrier LCD selected by the user in the way of corresponding to the stereoscopic images.

7. The apparatus as claimed in claim 1, wherein the apparatus for generating stereoscopic images in the scheme of barrier LCD corresponds to a mobile terminal, and the output device for outputting stereoscopic images in the interlaced scheme corresponds to a television (TV) set.

8. The apparatus as claimed in claim 1, wherein the control unit further includes generating stereoscopic images by using the detected left image and the detected right image when the selected mode corresponds to the mode of barrier LCD, and further includes providing the generated stereoscopic images to the output device when the output device selected to output the stereoscopic images corresponds to a device for outputting stereoscopic images in the scheme of barrier LCD.

9. The apparatus as claimed in claim 8, wherein the control unit further includes storing mode information on one of the interlaced mode and the mode of barrier LCD selected by the user in a way of corresponding to the stereoscopic images.

10. The apparatus as claimed in claim 9, wherein the control unit outputs a warning message to the user when the mode information is not compatible with an output scheme of stereoscopic images that the output device can support as a result of a comparison of the mode information to the output scheme of stereoscopic images.

11. The apparatus as claimed in claim 8, wherein the apparatus for generating stereoscopic images in the scheme of barrier LCD corresponds to a mobile terminal, and the output device for outputting stereoscopic images in the interlaced scheme corresponds to a television set.

12. An apparatus for generating stereoscopic images in a scheme of barrier Liquid Crystal Display (LCD), the apparatus comprising:
   an Image Signal Processing (ISP) unit for detecting, as a left image and a right image, a first light signal provided from a left camera sensor and a second light signal provided from a right camera sensor;
   a memory unit for storing the left image and the right image;
   a stereoscopic image processing unit for generating a stereoscopic image according to the scheme of barrier LCD by using the left image and the right image; and
   a control unit for rotating the left image and the right image by a first preset angle, respectively, when a currently selected output device for outputting stereoscopic images is in an interlaced mode, for generating a stereoscopic image, for rotating the completed stereoscopic images by a second preset angle when generating the stereoscopic image is completed, and for outputting the stereoscopic images rotated by 90 degrees to the output device.

13. The apparatus as claimed in claim 12, wherein the first and the second preset angles correspond to −90 degrees and 90 degrees, respectively.

14. The apparatus as claimed in claim 12, wherein the apparatus for generating stereoscopic images in the scheme of barrier LCD corresponds to a mobile terminal.

15. A method for generating stereoscopic images by an apparatus for generating stereoscopic images in a scheme of barrier Liquid Crystal Display (LCD), the method comprising the steps of:
 (1) selecting one of an interlaced mode and a mode of barrier LCD by a user;
 (2) detecting the first and second light signals provided from the left and right camera sensors of the apparatus for generating stereoscopic images as images rotated by a first preset angle when a selected mode corresponds to the interlaced mode; and
 (3) generating stereoscopic images according to the mode of barrier LCD by using the detected images, and storing the generated stereoscopic images.

16. The method as claimed in claim 15, wherein the first preset angle corresponds to −90 degrees.

17. The method as claimed in claim 15, further comprising:
 sensing an output scheme of stereoscopic images supported by an output device for outputting stereoscopic images according to the user's selection when the user desires to output the stored stereoscopic images; and
 outputting rotated stereoscopic images to the output device after rotating the stored stereoscopic images by 90 degrees when the output device corresponds to a device for outputting stereoscopic images generated in the interlaced scheme, and outputting the stored stereoscopic images to the output device when the output device corresponds to a device for outputting stereoscopic images generated in the scheme of barrier LCD.

18. The method as claimed in claim 15, wherein step (1) further comprises generating stereoscopic images by using images sensed as the light signals provided from the left and right camera sensors of the apparatus for generating stereoscopic images when the selected mode corresponds to the mode of barrier LCD.

19. The method as claimed in claim 18, further comprising:
 sensing an output scheme of stereoscopic images supported by an output device for outputting stereoscopic images according to the user's selection when the user desires to output the stored stereoscopic images; and
 outputting rotated stereoscopic images to the output device after rotating the stored stereoscopic images by 90 degrees when the output device corresponds to a device for outputting stereoscopic images generated in the interlaced scheme, and outputting the stored stereoscopic images to the output device when the output device corresponds to a device for outputting stereoscopic images generated in the scheme of barrier LCD.

20. The method as claimed in claim 19, wherein step (3) and the step of generating stereoscopic images further comprise storing mode information on a mode selected by the user in the way of corresponding to the stereoscopic images.

21. The method as claimed in claim 20, wherein the step of sensing an output scheme of stereoscopic images further comprises outputting a warning message to the user when a generation scheme of stereoscopic images according to the mode information is not compatible with an output scheme of stereoscopic images that the output device supports according to the user's selection.

22. A method for generating stereoscopic images by an apparatus for generating stereoscopic images in a scheme of barrier Liquid Crystal Display (LCD), the method comprising the steps of:
 (a) detecting, as a left image and a right image, a first light signal provided from a left camera sensor and a second light signal provided from a right camera sensor, and storing the left image and the right image;
 (b) sensing a scheme of outputting stereoscopic images that an output device for outputting stereoscopic images supports according to a user's selection when the user desires to output the stored stereoscopic images;
 (c) rotating the left image and the right image by a first preset angle, respectively, when the scheme of outputting stereoscopic images that the output device for outputting stereoscopic images supports corresponds to a scheme of outputting stereoscopic images an interlaced mode; and
 (d) processing stereoscopic images processing by using the rotated left image and the rotated right image, rotating the processed stereoscopic images by a second preset angle again, and generating stereoscopic images of the interlaced scheme.

23. The method as claimed in claim 22, wherein the first and the second preset angles correspond to −90 degrees and 90 degrees, respectively.

24. The method as claimed in claim 22, which further comprising outputting the generated stereoscopic images to the output device.

25. The method as claimed in claim 22, wherein step (b) comprises:
 sensing an output scheme of stereoscopic images supported by an output device for outputting stereoscopic images according to the user's selection when the user desires to output the stored stereoscopic images; and
 generating stereoscopic images by using the left image and the right image when the output scheme of stereoscopic images supported by the sensed output device corresponds to a scheme of outputting stereoscopic images in the scheme of barrier LCD.

26. The method as claimed in claim 25, which further comprising outputting the generated stereoscopic images to the output device.

* * * * *